United States Patent [19]

Nobumasa et al.

[11] Patent Number: 4,770,929
[45] Date of Patent: Sep. 13, 1988

[54] LIGHT-WEIGHT COMPOSITE MATERIAL

[75] Inventors: Hitoshi Nobumasa; Kazuharu Shimizu, both of Otsu, Japan

[73] Assignee: Toray Industries, Inc., Tokyo, Japan

[21] Appl. No.: 92,398

[22] Filed: Sep. 2, 1987

[30] Foreign Application Priority Data

Sep. 2, 1986 [JP] Japan ................. 61-206454

[51] Int. Cl.$^4$ .............. B32B 9/00; B32B 18/00; B32B 27/00; B32B 5/18
[52] U.S. Cl. ................... 428/284; 428/285; 428/288; 428/311.1; 428/311.5; 428/367; 428/408
[58] Field of Search ............... 428/198, 284, 285, 288, 428/311.1, 311.5, 367, 408

[56] References Cited

U.S. PATENT DOCUMENTS

| | | | |
|---|---|---|---|
| 4,103,055 | 7/1978 | Levy | 428/198 |
| 4,438,172 | 3/1984 | Katsutoshi et al. | 428/198 |
| 4,659,624 | 4/1987 | Yeager et al. | 428/408 |
| 4,695,501 | 9/1987 | Robinson | 428/198 |
| 4,716,072 | 12/1987 | Kim | 428/285 |

FOREIGN PATENT DOCUMENTS

| | | |
|---|---|---|
| 47-21754 | 6/1972 | Japan . |
| 49-29448 | 8/1974 | Japan . |
| 49-127612 | 12/1974 | Japan . |
| 51-94911 | 8/1976 | Japan . |
| 55-9504 | 1/1980 | Japan . |
| 56-99656 | 8/1981 | Japan . |
| 56-162644 | 12/1981 | Japan . |

Primary Examiner—William J. Van Balen
Attorney, Agent, or Firm—Birch, Stewart, Kolasch & Birch

[57] ABSTRACT

A light-weight composite material having a laminated structure comprises at least one porous fiber layer constructed of reinforcing short fibers which are distributed in random directions and combined with each other mainly at intersections thereof by carbonized binder and at least one fiber reinforced plastic layer comprising reinforcing fibers and a matrix resin. The composite material can have a low density, high mechanical properties of strength, modulus of elasticity and rigidity.

17 Claims, 3 Drawing Sheets 7 8 4

LIGHT-WEIGHT COMPOSITE MATERIAL

BACKGROUND OF THE INVENTION

1. Field of the Invention

The present invention relates to a light-weight composite material having a low density, good strength, high modulus of elasticity and rigidity, with good homogeneity as regards these properties. It concerns a composite material suitable in use for reinforcing materials or structural materials for an airplane, a land vehicle such as a car, sounding plates of a marimba or a xylophone and a sounding board of a piano or a guitar, a diaphragm of a speaker, and a sports article such as a surfboard, a racket for pingpong, a table for pingpong playing, a ski, etc.

2. Description of the Prior Art

As a conventional light-weight composite material for use as a structural material for musical instruments etc., materials disclosed in JP-A-49-127612, JP-A-55-9504, JP-A-56-99656 and JP-A-56-162644 are known. Each of such conventional materials is made as a composite of a resin and reinforcing fibers. As the resin which constitutes a matrix of the material has independent cells caused by foaming, the material has the properties of light weight as well as good strength and high modulus of elasticity. However, the material is not so good on homogeneity, in respect of a large variation of strength, or modulus of elasticity or rigidity throughout the material. This defect of the material is due to a considerable non-uniformity in the distribution and size of the independent cells.

This non-uniformity of the distribution and size of the independent cells arises mainly during the manufacturing process of the above material. In the process, the resin containing foaming agent and reinforcing fibers is compounded, and the foaming and forming of the composite material are concurrently performed by heating the material. Since the cells which are generated in the material during the process can move easily along the axial directions of the fibers but cannot easily move in other directions, considerable non-uniformity of the distribution of the cells is liable to occur. Also, since some cells grow by coalescing with each other, there occur great differences between the sizes of such expanded cells and the sizes of uncoalesced cells, thereby causing a large disparity in the sizes of the cells.

Moreover, in the above conventional material, when the expansion ratio of foaming is increased in order to decrease the density of the material to a low value, the coalescence of the cells occurs violently and long or widely continuous cells (open cells) are generated. The open cells cause the strength, modulus of elasticity and rigidity of the material to decrease. Therefore, the density of the material cannot be reduced too much, the possible density being, at lowest, about 0.9 g/cm$^3$.

Furthermore, as the matrix resin of the above material is hardened during foaming, it is difficult to control the timing of the hardening and the temperature distribution in the thickness direction of the material. Accordingly, it becomes difficult to control the expansion ratio of foaming and the porosity of the material, and consequently to obtain a material with a proper balance of strength, modulus of elasticity and rigidity.

On the other hand, JP-B-47-21754, JP-B-49-29448 and JP-A-51-94911 disclose materials in which a foamed plastic or a low specific gravity plastic (for example, styrol foam) is sandwiched between two fiber reinforced plastic layers. In such materials, however, as the core layer of the material is constructed of merely a porous layer of a plastic, the strength, modulus of elasticity and rigidity of the layer itself can not be increased much. As a result, the mechanical properties of the material as a whole are not very high. To give the material a strength etc. higher than a certain level, it is necessary to increase the thickness of the material, and so it is difficult to obtain a relatively thin material. Moreover, as there is a great difference of modulus of elasticity between the core layer and the outer layers of the material, the sound effect of the material is not very good when it is applied to a musical instrument or a speaker.

Furthermore, there is a known composite material in which a layer of glass fiber mat or cellulose fiber mat is sandwiched between outer fiber reinforced plastic layers. In such a material, however, as the glass fiber mat or the cellulose fiber mat constituting a core layer is conventional, the strength, and modulus of elasticity and rigidity of the core layer are extremely low. Therefore, the mechanical properties of the composite material as a whole are also low. In order to give a high strength to the material, the thickness ratio of the outer fiber reinforced plastic layers must be increased, but, if this is done, the material will not be light in weight.

Still furthermore, there is a known composite material which has a structure in which a layer of a honeycomb-construction aluminium or paper is sandwiched between outer fiber reinforced plastic layers. In such a material, however, as the core layer having a honeycomb-construction must be of a certain thickness, there is a limitation on forming a thin composite material. Also, it is difficult to freely set or change the ratio between the thickness of the core layer and the thickness of the outer layers.

SUMMARY OF THE INVENTION

An object of the present invention is to provide a light-weight composite material having the properties of low density and good strength, and high modulus of elasticity and rigidity and wherein these properties are comparatively uniform throughout the material.

Another object of the present invention is to provide a light-weight composite material having a thin structure but having good strength, and high modulus of elasticity and rigidity.

A further object of the present invention is to provide a light-weight composite material wherein the thickness and type of a core layer, the thickness and type of outer layers, the ratio of thicknesses between the core layer and the outer layers, and the laminated structure of layers can be chosen to a great extent, thus giving the most suitable properties to the material according to the intended use.

To accomplish the above objects, a light-weight composite material according to the present invention has a laminated structure, at least one layer being a porous fiber layer and at least one layer being a fiber reinforced plastic (hereinafter referred to "FRP") layer comprising reinforcing fibers and a matrix resin. The porous fiber layer is constructed of reinforcing short fibers, the reinforcing short fibers being distributed in random directions and combined with each other mainly at intersections thereof by carbonized binder.

The laminated structure of light-weight composite material according to the present invention has one or more layers of porous fiber and one or more layers of FRP. For example, the composite material may be constituted by a laminated structure of two layers consisting of a single porous fiber layer and a single FRP layer, a laminated structure of three layers consisting of an FRP layer/a porous fiber layer/an FRP layer, or a laminated structure consisting of more layers such as an FRP layer/a porous fiber layer/an FRP layer/a porous fiber layer/an FRP layer. The laminated structure may include the same kind of layers adjacent to each other, such as an FRP layer/an FRP layer/a porous fiber layer/a porous fiber layer/an FRP layer/an FRP layer or an FRP layer/a porous fiber layer/a porous fiber layer/a porous fiber layer/an FRP layer.

In the material having a laminated structure where one of the outermost layers is a porous fiber layer, for example, a two layer structure of a single porous fiber layer and a single FRP layer, the material can be attached to a structural member with the porous fiber layer facing the surface of the structural member, in order to reinforce the member. In a material having not less than three layers, desirably both of the outermost layers, where the greatest bending stress in the material is generated, are constructed of FRP.

The porous fiber layer is constructed of reinforcing short fibers. In the layer, the reinforcing short fibers are distributed at random in two-dimensional directions or three-dimensional directions, and the distributed reinforcing short fibers are combined with each other mainly at intersections thereof by carbonized binder. The reinforcing short fibers consist of fibers which are not deteriorated and can maintain their configuration in a carbonization process described later. Fibers of great strength with a high modulus of elasticity, such as carbon fibers, glass fibers, silicon carbide fibers, boron fibers, zirconia fibers or amorphous fibers, or a mixture of any of these fibers are suitable. The average fiber length of these short fibers is generally within 50 mm. The reinforcing short fibers include milled fibers. Among the above short fibers, carbon fibers are the most preferable, because carbon fibers have relatively high strength and high modulus of elasticity, and carbon fibers are completely stable at the temperature for carbonizing the binder. The carbon fibers may be so-called low temperature carbonized carbon fibers which are made by carbonizing raw material fibers at relatively low temperature of 500°–1200° C.

The carbonized binder, which combines reinforcing short fibers mainly at their intersections, may be made by carbonizing polyvinylalcohol resin, phenolic resin or furan resin etc. The content of the carbonized binder in the porous fiber layer is preferably in the range of 10–50 wt. %, more preferably in the range of 20–40 wt. %. When the content is lower than 10 wt. %, the force combining the reinforcing short fibers is not enough and a sufficient strength of the material can not be obtained. When the content is higher than 50 wt. %, the porosity of the layer becomes too small and the light-weight characteristic of the material due to the porous fiber layer is spoiled.

The porosity of the porous fiber layer is preferably 50–90%. When the porosity is lower than 50%, the density of the layer becomes too high and the light-weight characteristic of the material deteriorates. When the porosity is higher than 90%, the strength of the layer becomes too low. The porosity of the porous fiber layer can be controlled according to the use of the composite material. For a use requiring the properties of high strength, high modulus of elasticity or high rigidity, relatively low porosity is preferable. For a use requiring the property of light weight rather than high strength, relatively high porosity is preferable. For any use requiring balanced properties of strength and weight, the porosity may be controlled to the middle value in the above range. For instance, in use for a speaker, the required property is often light weight rather than high strength, so the porosity of the porous fiber layer is preferably set to a relatively high value. On the contrary, in use for a sports article such as a ski, the required properties are high strength, high modulus of elasticity and high rigidity rather than light weight, so the porosity is preferably set to a relatively low value.

As the reinforcing short fibers are distributed at random in the porous fiber layer, the distribution of the short fibers is uniform all over the layer. As the porous fiber layer is constructed by combining the short fibers with carbonized binder, not by foaming as in the conventional material, there is no problem due to cells generated by foaming. Therefore, the porous fiber layer can become homogenous and can have uniform properties.

In the present invention, the FRP layer comprises reinforcing fibers and a matrix resin. The reinforcing fibers should have high strength and high modulus of elasticity like the reinforcing short fibers in the porous fiber layer. The reinforcing fibers are orientated unidirectionally or formed as a woven fabric such as plain weave, satin weave or twill weave, or formed as a mat. The reinforcing fibers may be continuous fibers, short fibers or long fibers (strands or filaments). In manufacturing FRP for the FRP layer, sheet molding compound may be used. The formation and orientation of the reinforcing fibers may be decided depending on the use of the composite material and/or the laminated structure of the material. For example, in the light-weight composite material for a diaphragm of a speaker, according to the present invention, one of the preferred laminated structures of the material is a three layer structure of FRP layer/porous fiber layer/FRP layer, plain weave fabric is applied to the reinforcing fibers of the FRP layers, and the directions of the orientations of the reinforcing fibers in the two FRP layers are preferably different from each other, for example, by an angle of 45 degrees.

The proportion of the reinforcing fibers in an FRP layer is preferably 30–70 vol. %, more preferably 50–65 vol. %. When the quantity is less than 30 vol. %, the reinforcing effect of the FRP layer due to the fibers is too small. When the quantity is more than 70 vol. %, the volume of the matrix resin becomes too small, thereby decreasing the strength of adhesion between the fibers.

As a matrix resin for the FRP layer, thermosetting resin or thermoplastic resin can be used. The thermosetting resin consists of, for example, epoxy resin, unsaturated polyester resin, phenolic resin or polyimide resin. The thermoplastic resin consists of, for example, polyamide resin, polyethylene resin, polypropylene resin, polystyrene resin, polyvinylchloride resin or acrylonitrile-butadiene-styrene resin. Resin having a high melt viscosity is preferable in order to prevent the resin from remarkably invading the porous fiber layer in the manufacturing process described later.

The matrix resin may contain a modifier depending on the use of the composite material. For example, when a modifier such as polyethylene glycol, polypropylene glycol, polysulfide, polyether sulfone, polypropylene sulfide, or CTBN rubber (carboxy-terminated butadiene acrylonitrile rubber) is contained in epoxy resin of the FRP layer in an amount of 10-20 vol. %, the mechanical properties of the FRP layer (and of the composite material) such as vibration damping, shock resistance etc. are increased. Material so improved in vibration damping property is suitable for a diaphragm of a speaker, and material so improved in shock resistance property is suitable for a reinforcing material or a structural material of an airplane or a land vehicle.

The thickness of the FRP layer may be chosen according to the intended use of the material or the laminated structure. From the viewpoint of making the material light-weight, the thickness of the FRP layer is preferably less than 1 mm. In the use for instruments etc. requiring light-weight property rather than high strength, the thickness is preferably in the range of 0.01-0.05 mm.

The light-weight composite material according to the present invention can be manufactured by various methods.

For example, the porous fiber layer is made as follows. A fiber bundle having continuous reinforcing fibers is cut down to form short fibers, the cut reinforcing short fibers are separated from each other in a vortex aqueous jet, and the separated reinforcing short fibers are deposited at random onto an endless belt. An aqueous solution containing polyester, polyvinylchloride etc. is added to the at random distributed reinforcing short fibers on the belt, and the distributed fibers are fixed in the shape of a sheet by drying the aqueous solution. The sheet obtained is called a mat. Next, a resin capable of forming a carbonized binder, for example, phenolic resin, is impregnated into the mat, and the mat is hardened by heating at 130°-170° C. The hardened sheet is heated in an inert gas atmosphere of 800°-2500° C., thereby carbonizing the phenolic resin. During this carbonization, the phenolic resin collects toward the intersections of the reinforcing short fibers so as to shrink, and the collected or shrunk resin is carbonized mainly at intersections of the reinforcing short fibers as carbonized binder combining the fibers. Thus the porous fiber sheet is obtained. In this process, if the amount of the phenolic resin is too great, the meshes between the fibers are filled with the resin, the porosity of the layer becomes too low and the density of the layer or the composite material becomes too high. If the amount of the phenolic resin is too small, many uncombined fibers exist and the strength and the modulus of elasticity of the material decrease. Therefore, the amount of the phenolic resin must be controlled to an adequate value not to generate such states.

On the other hand, a prepreg sheet containing reinforcing fibers may be prepared for making an FRP layer. One or more prepreg sheets and one or more porous fiber sheets are laminated so as to constitute the required laminated structure. By heating and pressing the laminated sheets, the resin in the prepreg sheet is hardened, and the prepreg sheet and the porous fiber sheet are integrated by the resin of the prepreg sheet. The prepreg sheet forms the FRP layer and the porous fiber sheet forms the porous fiber layer. To integrate both of the sheets more completely, coating resin or a film consisting of the same resin as the resin in the prepreg sheet may be interposed between the sheets. In the above integrating process, since the resin of the prepreg sheet enters into the porous fiber layer if the force of the pressing is too large, the pressing force must be appropriately controlled in accordance with the heating temperature to prevent such a state.

As a modified method for manufacturing a light-weight composite material according to the present invention, a prepreg sheet may be hardened to FRP sheet, before it is integrated with a porous fiber sheet. After making an FRP sheet, the FRP sheet and the porous fiber sheet are adhered to each other to form a composite material. In this method, when the matrix resin of the FRP sheet is a thermoplastic resin, fusion is possible as a method of adhesion.

BRIEF DESCRIPTION OF THE DRAWINGS

The accompanying drawings illustrate several embodiments of the invention and together with the description serve to explain the principles of the invention.

DETAILED DESCRIPTION OF THE PREFERRED EMBODIMENTS

Figure 1:
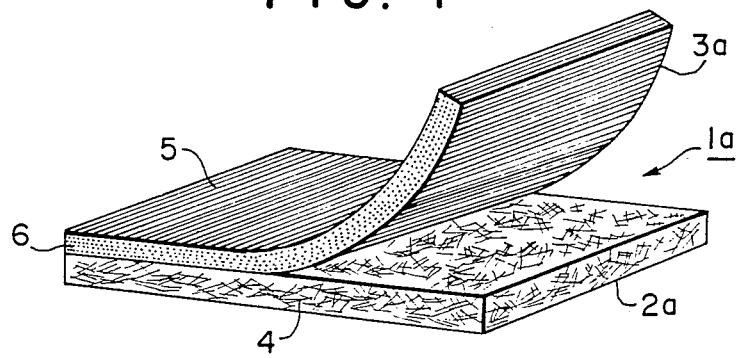
FIG. 1 is a perspective view of a light-weight composite material according to an embodiment of the present invention.
Figure 2:
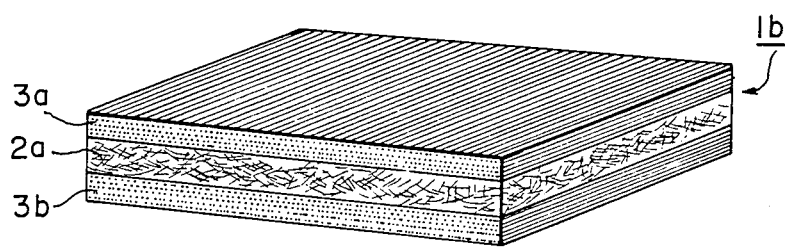
FIG. 2 is a perspective view of a light-weight composite material according to another embodiment of the present invention.
Figure 3:
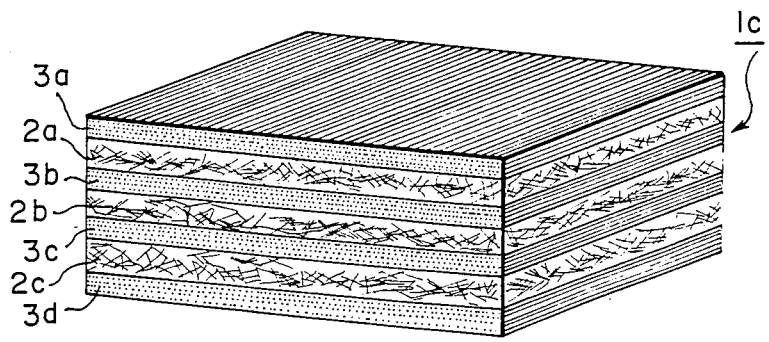
FIG. 3 is a perspective view of a light-weight composite material according to a further embodiment of the present invention.

The illustrated preferred embodiments of the present invention will be described hereunder referring to the attached drawings wherein like reference numerals refer to similar parts;

FIGS. 1 to 3 show three types of laminated structures of light-weight composite materials according to the present invention. In FIG. 1, a composite material 1a consists of a single porous fiber layer 2a and a single FRP layer 3a. The porous fiber layer 2a has reinforcing short fibers 4 distributed at random in the layer. The FRP layer 3a has unidirectional reinforcing fibers 5 and matrix resin 6. In FIG. 2, a composite material 1b is formed as a laminated structure of three layers, that is, one porous fiber layer 2a and two FRP layers 3a and 3b. In FIG. 3, a composite material 1c is formed as a laminated structure of seven layers, that is, three porous fiber layers 2a, 2b and 2c and four FRP layers 3a, 3b, 3c and 3d. The porous fiber layers 2a, 2b and 2c and the FRP layers 3a, 3b, 3c and 3d are arranged alternately.

As aforementioned, the reinforcing fibers of FRP layers can adopt various structures such as an unidirectional orientation, a woven fabric, or a mat. Also, as for the laminated structure, various kinds of structures can be applied depending on the use of the composite material, as described later (examples 1-22).

Figure 4:
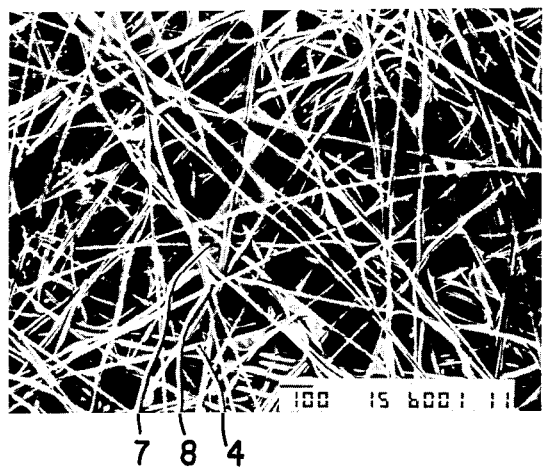
FIG. 4 is a microphotograph (magnification 50 times) of a porous fiber layer of a light-weight composite material according to the present invention.
Figure 5:
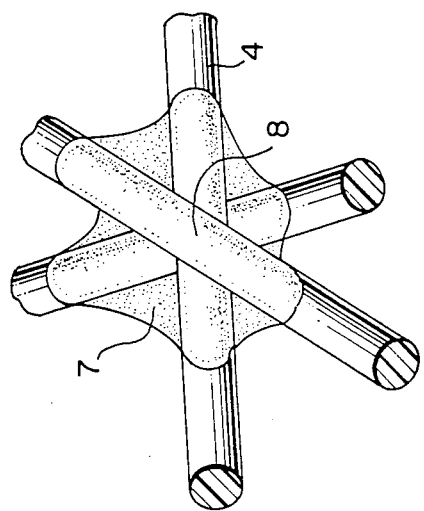
FIG. 5 is a schematic perspective view showing a intersection of reinforcing short fibers in a porous fiber layer of a light-weight composite material according to the present invention.

FIG. 4 shows an enlarged inside structure of a porous fiber layer, and FIG. 5 illustrates an intersection and adjacent parts of reinforcing short fibers. Carbonized binder 7 exists mainly at the intersections 8 of the reinforcing short fibers 4.

The properties of the porous fiber layer will now be explained in detail, as compared with the conventional mat where reinforcing fibers are combined by adhesive compound.

In the conventional mat, since fibers are combined only at intersections thereof, that is, only at points, the fibers are seldom rigidly fixed to each other. Besides, since the adhesive compound itself does not have high mechanical properties of strength, modulus of elasticity and rigidity, the force of fixing the fibers is not high. Accordingly, stress is hardly transmitted between the fibers, and the mat does not have great rigidity. Thus, when the mat is pressed, it is easily depressed, and even when a small outer force acts on the mat, the configuration of the mat is easily broken up.

In the porous fiber layer according to the present invention, however, as shown in FIGS. 4 and 5, the reinforcing short fibers are effectively combined with each other, not only at intersections thereof but also at the portions near to the intersections. This means that the combining area effective for strongly combining the fibers is increased, while the porosity of the layer required for a light-weight property is ensured. Moreover, since carbonized binder itself as a combining compound has properties of high strength, high modulus of elasticity and high rigidity, the combining force between the fibers is further increased and the freedom of movement of the combined fibers is greatly suppressed. As a result, even if the layer is of light weight and low density, it can have high rigidity together with great strength and high modulus of elasticity. Also, the composite material, which is a combination of the porous fiber layers and FRP layers, can have the mechanical properties of high strength, high modulus of elasticity and high rigidity.

Furthermore, since the manufacturing process of a light-weight composite material according to the present invention does not necessitate a foaming operation, the porosity of the porous fiber layer can be easily controlled, and the above mechanical properties of the material as a whole can be also easily controlled to required values, whilst the formation of the required laminated structures is effected with ease.

The vibration damping property of the composite material of the present invention can be also controlled easily. By controlling the vibration damping property of the material to a high value, resonance phenomena in a structural member, to which the material is applied, can be greatly suppressed. In case such a material is applied to a speaker, a high fidelity of sound reproduction can be achieved. In case the material is applied to a ski, as unnecessary vibration during skiing can be prevented, stability of the board and comfort of the skier can be increased. If the material is applied to a structural member of a car, as the vibrations during driving can be suppressed, stability and drivability of the car can be increased. If the material is applied as a structural material for a musical instrument, an adequate vibration damping property is required. When the damping property is too high, echo effect becomes small. When the damping property is too low, echo effect becomes too high and the sound due to a previous action overlaps the sound due to the next action.

The light-weight composite material according to the present invention is applied to various uses.

Figure 6:
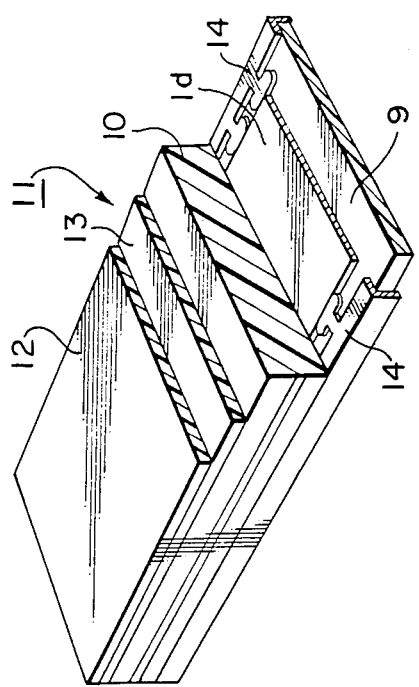
FIG. 6 is a partial perspective view of a ski, cut away to show the layered structure, in which a light-weight composite material according to the present invention is incorporated.
Figure 7:
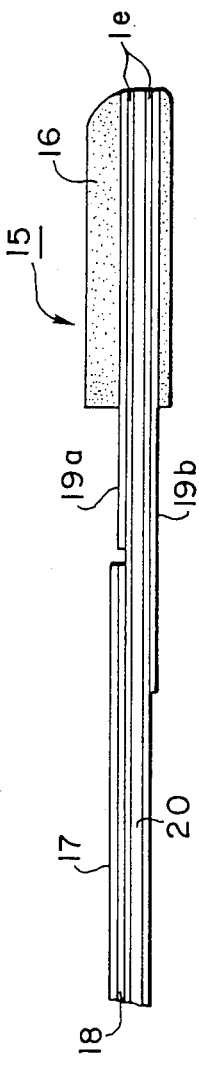
FIG. 7 is a side view of a pingpong racket to which a light-weight composite material according to the present invention is applied.

FIGS. 6 and 7 illustrate two typical applications of light-weight composite materials according to the present invention. In FIG. 6, the light-weight composite material 1d according to the present invention is disposed between a polyethylene outer plate 9 and a polyurethane core plate 10, in a ski 11. This ski 11 comprises a ABS outer plate 12, FRP intermediate plate 13, core plate 10, light-weight composite material plate 1d, outer plate 9 and steel edges 14. The material 1d increases the mechanical properties of the ski 11 and decreases its weight.

In FIG. 7, the light-weight composite material is applied to a pingpong racket 15. The racket 15 has a grip 16, a rubber sheet 17, a sponge sheet 18, grip plates 19a and 19b, and a central ligneous plate 20. The light-weight composite material plates 1e of the invention are disposed on both outer surfaces of the central ligneous plate 20. The material 1e increases the mechanical properties of the racket 15, and in particular reinforces the strength and modulus of elasticity of central plate 20.

Next, more concrete examples will be described.

EXAMPLES 1-22

Examples 1-22 according to the present invention are summarized in Tables 1-6. In accordance with the method for manufacturing the material and the method for measuring the properties of the material, only Example 1 is explained in detail. Similar manufacturing methods and measuring methods are applied to Examples 2-22, and Examples 2-22 can be understood from the Tables.

In Example 1, prepreg sheets for FRP layers are prepared as follows. Strands of carbon fibers T300 (produced by Toray Industries, Inc., average diameter of a fiber; 7 $\mu$m, number of fibers; 3000) are arranged unidirectionally to form a sheet, and epoxy resin is impregnated into the sheet. After that, the sheet is calendered between rollers, and the strands in the sheet are sufficiently widened. Then, the sheet is heated and epoxy resin becomes B-stage. Thus unidirectional prepreg sheets having a thickness of 0.02 mm are obtained.

Porous fiber sheets are made as follows. The reinforcing short fibers are made by cutting down the above carbon fiber strands. The cut reinforcing short fibers are separated in a vortex aqueous jet, and the separated reinforcing short fibers are deposited at random onto an endless belt to form a fiber layer with a thickness of 0.5 mm and a weight of 50 g/m². After that, aqueous solution containing polyvinylchloride is added to the distributed reinforcing short fibers on the belt, and the distributed fibers are fixed in the shape of a sheet by drying the solution. The sheet is separated from the belt, and methanol solution containing 20 wt. % phenol, which is a resin capable of forming a carbonized binder later, is added to the sheet. The sheet is hardened by heating at 130°-170° C. The hardened sheet is heated to 1500° C. and maintained at that temperature for 30 minutes. By the heating the phenolic resin becomes carbonized binder, and the carbonized binder combines fibers mainly at their intersections. Thus porous fiber sheets are obtained, the amount of the carbonized binder is 30 wt. % and the porosity of the sheet is 70%.

Next, six prepreg sheets and five porous fiber sheets thus obtained are laminated alternately with B-stage epoxy resin films therebetween (film thickness: 0.03 mm; weight: 30 g/m$^2$). Both of outermost layers are the prepreg sheets.

The laminated material is set in a mold, and the FRP sheets and porous fiber sheets are integrated under a temperature of 130° C. and a pressure of 2 kg/cm$^2$ (196 KPa) for 60 minutes. Thus light-weight composite material according to the present invention is obtained.

The total thickness of the obtained material is 1.92 mm, and the density of the material is 0.6 g/cm$^3$. The flexural strength of the material in the direction of fiber orientation in the FRP layer is 20 kg/mm$^2$ (196 N/mm$^2$), and the flexural modulus is 2000 kg/mm$^2$ (19.6 KN/mm$^2$). In order to measure the homogeneity of the material, ten samples were cut out from the material. The dispersion of the density of the above samples was less than 10%.

The damping loss factor of vibration in accordance with the material is measured as explained hereunder. The loss factors are measured by the resonance peak half-width value method. In this method, the width of the flexural wave resonance frequencies in a cantilever beam sample at 3 dB from the peak amplitudes are measured and the loss factors (L) are calculated from the 3 dB widths ($\Delta fn$) and the resonance frequencies (fn) by the following equation.

$$L = \Delta fn/fn$$

In the measurement by the above method, the loss factor of the material was 0.004.

When the composite material is used for a resonance board of a guitar, sounds having a long range radiation can be obtained, and sharp leading edges of the sounds can be obtained. In a low sound frequency area, massive feeling can be obtained, and in a high sound frequency area, a tone having a good echo can be obtained.

Examples 2–22 can be referred to Tables 1–6. In the Tables, the following abbreviations are used.

F: unidirectional FRP
C: FRP using a woven fabric
M: FRP using a mat
P: porous fiber layer
PR: phenolic resin
PVAR: polyvinylalcohol resin
FR: furan resin
CF: carbon fiber
GF: glass fiber
AF: alumina fiber
KF: aramide fiber
ER: epoxy resin
UPR: unsaturated polyester resin
PPR: polypropylene resin
PAR: polyamide resin
PIR: polyimide resin
PG: polyethylene glycol
CTBN: carboxy-terminated butadiene acrylonitrile
UD: unidirectional prepreg
PW: plain weave fabric

TABLE 1

| Example No. | Laminated structure | Use |
|---|---|---|
| 1 | F/P/F/F/P/F/P/F/P/F | sounding board of guitar |
| 2 | C/P/C | diaphragm of speaker |
| 3 | F/P/P/P/F/F | ski |
| 4 | F/F/P/P/F | ski |
| 5 | F/F/P | diaphragm of speaker |
| 6 | C/P | diaphragm of speaker |
| 7 | F/P/M | diaphragm of speaker |
| 8 | F/P/F/P/F/P/F | ski |
| 9 | C/P/C/P/C/P/C | structural member for car |
| 10 | C/P/C | structural member for car |
| 11 | C/C/P/P/P/C/C | plate for bag |
| 12 | C/P | plate for bag |
| 13 | C/P/P/P/C | plate for bag |
| 14 | F/F/P/P/P/F/F | ski |
| 15 | C/P/C | diaphragm of speaker |
| 16 | M/P | structural member for airplane |
| 17 | F/P/F | structural member for airplane |
| 18 | F/F/F/P/P/F/F | structural member for airplane |
| 19 | C/P/C/P/C | structural member for airplane |
| 20 | C/P/P/P/C | structural member for airplane |
| 21 | F/P/F/P/F | core plate for racket |
| 22 | F/F/F/P/P/F/F | table for pingpong |

TABLE 2

| Example No. | Porous fiber layer | | | |
|---|---|---|---|---|
| | Binder resin | Fiber | Carbonized binder | Porosity |
| 1 | PR | CF 50 g/m$^2$ | 30 wt. % | 70% |
| 2 | PR | CF 50 g/m$^2$ | 30 wt. % | 70% |
| 3 | PR | CF 50 g/m$^2$ | 30 wt. % | 70% |
| 4 | PR | CF 50 g/m$^2$ | 30 wt. % | 70% |
| 5 | PR | CF 50 g/m$^2$ | 30 wt. % | 70% |
| 6 | PR | CF 50 g/m$^2$ | 30 wt. % | 70% |
| 7 | PR | CF 50 g/m$^2$ | 30 wt. % | 70% |
| 8 | PR | CF 100 g/m$^2$ | 35 wt. % | 64% |
| 9 | PVAR | GF 150 g/m$^2$ | 25 wt. % | 75% |
| 10 | FR | AF 200 g/m$^2$ | 30 wt. % | 80% |
| 11 | PVAR | GF 100 g/m$^2$ CF 50 g/m$^2$ | 30 wt. % | 70% |
| 12 | FR | GF 200 g/m$^2$ | 20 wt. % | 73% |
| 13 | FR | CF 50 g/m$^2$ | 25 wt. % | 72% |
| 14 | PVAR | CF 100 g/m$^2$ | 40 wt. % | 65% |
| 15 | PR | CF 40 g/m$^2$ | 25 wt. % | 73% |
| 16 | PR | CF 60 g/m$^2$ | 20 wt. % | 75% |
| 17 | PR | CF 40 g/m$^2$ | 30 wt. % | 70% |
| 18 | PR | CF 40 g/m$^2$ | 40 wt. % | 65% |
| 19 | PVAR | CF 40 g/m$^2$ | 40 wt. % | 65% |
| 20 | PVAR | CF 60 g/m$^2$ | 30 wt. % | 70% |
| 21 | PR | CF 40 g/m$^2$ | 30 wt. % | 70% |
| 22 | PR | CF 80 g/m$^2$ | 40 wt. % | 65% |

TABLE 3

| Example No. | FRP layer | | | |
|---|---|---|---|---|
| | Matrix | Modifier | Fiber | Structure |
| 1 | ER | — | CF | UD 20 g/m$^2$ |
| 2 | ER | PG 15 wt. % | CF | PW 90 g/m$^2$ |
| 3 | ER | PG 15 wt. % | CF | UD 300 g/m$^2$ |
| 4 | ER | — | KF | UD 260 g/m$^2$ |
| 5 | ER | PG 15 wt. % | CF | UD 20 g/m$^2$ |
| 6 | ER | PG 15 wt. % | CF & KF | mixed PW 80 g/m$^2$ |
| 7 | ER | PG 15 wt. % | CF | UD 60 g/m$^2$, mat 40 g/m$^2$ |
| 8 | ER | PG 15 wt. % | GF | UD 350 g/m$^2$ |
| 9 | ER | — | GF | PW 400 g/m$^2$ |
| 10 | UPR | CTBN 15 wt. % | GF | PW 400 g/m$^2$ |
| 11 | PPR | — | CF | PW 250 g/m$^2$ |
| 12 | PAR | — | KF & GF | mixed PW 300 g/m$^2$ |
| 13 | PPR | — | KF & CF | mixed PW 200 g/m$^2$ |
| 14 | PAR | — | KF | UD 260 g/m$^2$ |
| 15 | PPR | — | CF | PW 90 g/m$^2$ |
| 16 | ER | CTBN 15 wt. % | GF | mat 100 g/m$^2$ |
| 17 | PIR | — | CF | UD 250 g/m$^2$ |
| 18 | PIR | — | CF | UD 300 g/m$^2$ |

TABLE 3-continued

| Example No. | FRP layer | | | |
|---|---|---|---|---|
| | Matrix | Modifier | Fiber | Structure |
| 19 | PIR | — | CF | PW 90 g/m² |
| 20 | PIR | CTBN 15 wt. % | CF | PW 180 g/m² |
| 21 | ER | — | CF | UD 20 g/m² |
| 22 | UPR | — | CF | UD 300 g/m² |

TABLE 4

| Example No. | Adhesive between layer | Thickness of a layer (mm) | | Total thickness (mm) |
|---|---|---|---|---|
| | | FRP layer | Porous layer | |
| 1 | ER film 30 g/m² | 0.02 | 0.36 | 1.92 |
| 2 | ER film 30 g/m² | 0.1 | 0.36 | 0.56 |
| 3 | ER film 30 g/m² | 0.31 | 0.36 | 2.0 |
| 4 | ER film 30 g/m² | 0.3 | 0.36 | 1.6 |
| 5 | ER film 30 g/m² | 0.02 | 0.36 | 0.4 |
| 6 | ER film 30 g/m² | 0.1 | 0.36 | 0.46 |
| 7 | ER film 30 g/m² | UD; 0.06, mat; 0.04 | 0.36 | 0.46 |
| 8 | ER film 30 g/m² | 0.3 | 0.74 | 3.42 |
| 9 | ER film 30 g/m² | 0.3 | 0.8 | 3.6 |
| 10 | ER film 30 g/m² | 0.3 | 0.72 | 1.0 |
| 11 | PPR film 20 g/m² | 0.25 | 0.7 | 3.1 |
| 12 | PAR film 20 g/m² | 0.3 | 1.1 | 1.4 |
| 13 | PPR film 30 g/m² | 0.25 | 0.34 | 1.52 |
| 14 | PAR film 30 g/m² | 0.3 | 0.73 | 4.12 |
| 15 | | 0.12 | 0.29 | 0.53 |
| 16 | PIR film 30 g/m² | 0.13 | 0.43 | 0.56 |
| 17 | PIR film 30 g/m² | 0.26 | 0.28 | 0.8 |
| 18 | PIR film 30 g/m² | 0.3 | 0.28 | 2.32 |
| 19 | PIR film 20 g/m² | 0.1 | 0.27 | 1.65 |
| 20 | PIR film 20 g/m² | 0.2 | 0.42 | 1.55 |
| 21 | ER film 30 g/m² | 0.02 | 0.36 | 0.78 |
| 22 | ER film 20 g/m² | 0.31 | 0.70 | 3.92 |

TABLE 5

| Example No. | Conditions of integrating | | |
|---|---|---|---|
| | Temperature (°C.) | Pressure (kg/cm²) | Time (minute) |
| 1 | 130 | 2 | 60 |
| 2 | 130 | 2 | 30 |
| 3 | 130 | 2 | 60 |
| 4 | 130 | 2 | 60 |
| 5 | 130 | 2 | 30 |
| 7 | 130 | 2 | 30 |
| 8 | 130 | 2 | 60 |
| 9 | 130 | 2 | 60 |
| 10 | 130 | 2 | 60 |
| 11 | 150 | 2 | 10 |
| 12 | 150 | 2 | 5 |
| 13 | 180 | 2 | 5 |
| 14 | 180 | 2 | 5 |
| 15 | 180 | 2 | 3 |
| 16 | 180 | 2 | 120 |
| 17 | 180 | 2 | 120 |
| 18 | 180 | 4 | 120 |
| 19 | 180 | 4 | 120 |
| 20 | 180 | 4 | 120 |
| 21 | 120 | 2 | 60 |
| 22 | 120 | 4 | 60 |

TABLE 6

| Example No. | Flexural strength (kg/mm²) | Flexural modulus (kg/mm²) | Density (g/cm³) | Damping loss factor |
|---|---|---|---|---|
| 1 | 20 | 2000 | 0.6 | 0.004 |
| 2 | 25 | 2400 | 0.9 | 0.012 |
| 3 | 90 | 8600 | 1.15 | 0.008 |
| 4 | 75 | 7400 | 1.0 | 0.010 |
| 5 | 16 | 1400 | 0.65 | 0.010 |
| 6 | 21 | 2000 | 0.74 | 0.015 |
| 7 | 35 | 3200 | 0.75 | 0.008 |
| 8 | 43 | 4100 | 1.02 | 0.008 |
| 9 | 24 | 2100 | 0.99 | — |
| 10 | 29 | 2700 | 1.16 | 0.010 |
| 11 | 35 | 3300 | 0.85 | — |
| 12 | 20 | 1800 | 0.77 | — |
| 13 | 33 | 3000 | 0.84 | — |
| 14 | 50 | 4500 | 0.78 | — |
| 15 | 44 | 4200 | 0.97 | 0.010 |
| 16 | 14 | 1300 | 0.86 | 0.010 |
| 17 | 110 | 10300 | 1.16 | — |
| 18 | 70 | 6800 | 1.27 | — |
| 19 | 32 | 3100 | 0.89 | — |
| 20 | 29 | 2600 | 0.77 | 0.010 |
| 21 | 22 | 1900 | 0.61 | — |
| 22 | 86 | 8200 | 0.99 | — |

Next, Comparisons are explained.

Comparison 1

The same prepreg sheets as in Example 1 are prepared. Fiber mat sheets are prepared as follows. Cut and separated reinforcing short fibers are distributed on an endless belt in a manner similar to Example 1, an aqueous solution containing an adhesive is added to the distributed fibers, and by drying, the distributed fibers are formed in the shape of a sheet. In this mat sheet, the adhesive combines the fibers almost only just at the points of intersection thereof.

Next, six prepreg sheets and five mat sheets are laminated alternately with B-stage epoxy resin films therebetween. The laminated material is set in a mold, and the prepreg sheets and the mat sheets are integrated under the condition of 130° C. for 60 minutes.

The total thickness of the obtained composite material is the same as in Example 1, i.e. 1.92 mm. However, the density is 0.3 g/cm³. The flexural strength is extremely low, 0.2 kg/mm² (1.96 N/mm²), and the flexural modulus is also low, 20 kg/mm² (0.196 KN/mm²). Since the material has such poor mechanical properties, it cannot be used as a structural material or a reinforcing material for a structural member.

Comparison 2

The same prepreg sheets as in Example 1 are prepared. To the mat sheets obtained in Comparison 1, epoxy resin is further impregnated. After the mat sheet is passed through calender rollers, the resin of the sheet is changed to B-stage, and thus a mat prepreg sheet having the thickness of 0.15 mm is obtained.

Next, six prepreg sheets and five mat prepreg sheets are laminated alternately with B-stage epoxy resin films therebetween. The laminated material is set in the mold, and adjacent layers are integrated under 130° C. for 60 minutes.

The total thickness of the obtained composite material is 1.92 mm. However, the density is very high, 1.35 g/cm³. The flexural strength is 30 kg/mm² (294 N/mm²) and the flexural modulus is 3500 kg/mm² (34.3 KN/mm²). The material is not so light in weight. When the material is used for a resonance board of a guitar, the properties of long range radiation, leading edge of sound, massive feeling and tone are not so good as compared with one obtained in Example 1.

As described hereinabove, a light-weight composite material according to the present invention, which is laminated with porous fiber layers where reinforcing short fibers are combined by carbonized binder and FRP layers, can have a low density, great flexural strength, high flexural modulus and high rigidity.

As foaming process is not required for manufacturing the material according to the present invention, there is no problem due to cells generated by foaming, the homogeneity of the material is very high, and the dispersion of the properties of the material is very low. Moreover, manufacturing of the material, control of the manufacturing conditions, setting of a laminated structure of the material are easy, because there are no complicated operations as in foaming.

Although several preferred embodiments of the present invention have been described in detail, it will be appreciated by those skilled in the art that various modifications and alterations can be made to the particular embodiments shown without materially departing from the novel teachings are advantages of this invention. Accordingly, it is to be understood that all such modifications and alterations are included within the scope of the invention, provided they come within the scope of the appended claims and their equivalents.

What is claimed is:

1. A light-weight composite material having a laminated structure comprising:
   at least one porous fiber layer constructed of reinforcing short fibers which are distributed in random directions and combined with each other mainly at intersections thereof by carbonized binder; and
   at least one fiber reinforced plastic layer comprising reinforcing fibers and a matrix resin.

2. The material of claim 1, wherein said reinforcing short fibers are distributed in two-dimensional directions.

3. The material of claim 1, wherein said reinforcing short fibers are distributed in three-dimensional directions.

4. The material of claim 1, wherein said reinforcing short fibers of said porous fiber layer are selected from the group consisting of carbon fibers, glass fibers, silicon carbide fibers, boron fibers and zirconia fibers.

5. The material of claim 1, wherein the porosity of said porous fiber layer is in the range of 50-90%.

6. The material of claim 1, wherein said carbonized binder is made from a resin selected from the group consisting of polyvinylalcohol resin, phenolic resin and furan resin.

7. The material of claim 1, wherein the content of said carbonized binder in said porous fiber layer is in the range of 10-50 wt. %.

8. The material of claim 7, wherein the content of said carbonized binder in said porous fiber layer is in the range of 20-40 wt. %.

9. The material of claim 1, wherein said reinforcing fibers of said fiber reinforced plastic layer are selected from the group consisting of carbon fibers, glass fibers, silicon carbide fibers, aramide fibers, boron fibers and zirconia fibers.

10. The material of claim 1, wherein said matrix resin of said fiber reinforced plastic layer is selected from the group consisting of epoxy resin, unsaturated polyester resin, phenolic resin, polyimide resin, polyamide resin, polyethylene resin, polypropylene resin, polystyrene resin, polyvinylchloride resin and acrylonitrile-butadiene-styrene resin.

11. The material of claim 1, wherein said matrix resin of said fiber reinforced plastic layer contains a modifier.

12. The material of claim 11, said modifier is selected from the group consisting of polyethylene glycol, polypropylene glycol, polysulfide, polyether sulfone, polypropylene sulfide and carboxy-terminated butadiene acrylonitrile rubber.

13. The material of claim 1, wherein said reinforcing fibers in said fiber reinforced plastic layer are unidirectionally orientated.

14. The material of claim 1, wherein said reinforcing fibers in said fiber reinforced plastic layer are formed as a woven fabric.

15. The material of claim 1, wherein said reinforcing fibers in said fiber reinforced plastic layer are formed as a mat.

16. The material of claim 1, wherein said material is constituted by a laminated structure of two layers consisting of a single porous fiber layer and a single fiber reinforced plastic layer.

17. The material of claim 1, wherein said material is constituted by a laminated structure consisting of more than two layers, both of the outermost layers being said fiber reinforced plastic layers.

* * * * *